(12) United States Patent
Puleston

(10) Patent No.: US 6,680,916 B2
(45) Date of Patent: Jan. 20, 2004

(54) METHOD FOR USING A BALANCED TREE AS A BASE FOR A ROUTING TABLE

(75) Inventor: Ian Puleston, Santa Clara, CA (US)

(73) Assignee: Tut Systems, Inc., Lake Oswego, OR (US)

(*) Notice: Subject to any disclaimer, the term of this patent is extended or adjusted under 35 U.S.C. 154(b) by 0 days.

(21) Appl. No.: 10/054,591

(22) Filed: Jan. 18, 2002

(65) Prior Publication Data

US 2002/0181480 A1 Dec. 5, 2002

Related U.S. Application Data

(60) Provisional application No. 60/263,559, filed on Jan. 22, 2001.

(51) Int. Cl.[7] ............................................. H04L 12/26
(52) U.S. Cl. .................... 370/254; 370/395.31; 370/408
(58) Field of Search ................................ 370/254, 255, 370/256, 257, 258, 395.31, 395.32, 395.52, 400, 401, 402, 403, 404, 405, 406, 407, 408; 709/220, 238, 242, 249, 251, 252, 253

(56) References Cited

U.S. PATENT DOCUMENTS

| | | | |
|---|---|---|---|
| 6,018,524 A | | 1/2000 | Turner et al. |
| 6,061,712 A | * | 5/2000 | Tzeng ........................ 709/202 |
| 6,067,574 A | * | 5/2000 | Tzeng ........................ 709/247 |
| 6,192,051 B1 | | 2/2001 | Lipman et al. |
| 6,385,649 B1 | * | 5/2002 | Draves et al. .............. 709/224 |
| 6,452,908 B1 | * | 9/2002 | Yamada et al. ............. 370/256 |
| 6,516,319 B1 | * | 2/2003 | Benayoun et al. .......... 707/100 |

OTHER PUBLICATIONS

International Search Report–PCT/US02/01744, May 17, 2002.

* cited by examiner

Primary Examiner—Kwang Bin Yao
(74) Attorney, Agent, or Firm—Blakely, Sokoloff, Taylor & Zafman LLP

(57) ABSTRACT

The invention provides a method for using a balanced tree as a base for a routing table. In one embodiment of the invention the routing table is stored as a binary search tree data structure in which a key value of each node in the tree corresponds with a network address of a network in the routing table. The tree is then rearranged so that any node having a key value which is a supernet of a network corresponding to the key value of any other node in the tree becomes a parent of such other node. In a preferred embodiment, the binary tree data structure is implemented as a red-black tree data structure.

21 Claims, 9 Drawing Sheets

| Address Class | Dotted-Decimal Notation Ranges |
| --- | --- |
| A | 1.xxx.xxx.xxx to 126.xxx.xxx.xxx |
| B | 128.0.xxx.xxx to 191.255.xxx.xxx |
| C | 192.0.0.xxx to 223.255.255.xxx |

FIGURE 2

METHOD FOR USING A BALANCED TREE AS A BASE FOR A ROUTING TABLE

PRIORITY

The present application claims the benefit of the filing date of a related Provisional Application filed on Jan. 22, 2001, and assigned Application Ser. No. 60/263,559.

FIELD OF THE INVENTION

This invention relates to networking. In particular it relates to routing of data packets between source and destination machines in data-packet networks.

BACKGROUND

In data-packet networks such as TCP/IP networks, packetized data is transmitted between source and destination machines along a route which typically includes many intermediate machines. The task of determining a route for a data packet from a source machine to a destination machine is handled by a router. Typically, a router stores a routing table which includes information on which connections lead to particular groups of addresses, priorities for connections to be used, and rules for handling both routine and special cases of traffic.

A routing table can grow to massive size and complexity. There is therefore, a need to store the routing table in an efficient data structure which can be searched relatively quickly.

One such data structure may be a binary tree data structure. Typically a binary tree data structure includes a number of nodes each of which can have at most two children or child nodes. The node at the top of the tree is called the root node. Any node can be considered to be the root of a sub-tree which consists of its children, its children's children, and so on. Each node is used to hold a data item called a key value. A node having no children is called a leaf node.

A special case of a binary tree is the binary search tree, which has a defining characteristic that a node's left child node must have a key value less than its parent and a node's right child node must have a key value greater than or equal to its parent. It will be appreciated that a search algorithm can be designed which takes advantage of this defining characteristic and searches only the left or right sub-tree of the tree depending on the value of the item being searched.

In implementing a binary search tree to store a routing table, the key value of each node in the routing table corresponds to the network address of a network in the routing table.

One problem associated with using a binary search tree data structure to store a routing table is that the left or right sub-trees may become disproportionately long which results in increased search times. Techniques exist to balance a binary tree by making the left and right sub-trees more or less equal in length. However, as discussed below, balancing could result in a problem when the routing table has, for example, routes to a Class B network and a number of Class C networks each of which is a subnet of the Class B network.

The problem occurs if the Class B network address occurs as a left child node of a Class C network address in the binary search tree. For convenience, the Class B network would be referred to as the supernet and the Class C network as the subnet. Thus, in this example, the supernet is a left child node of the subnet (or alternatively, the subnet is a parent of a supernet left child node). In this case, searching the tree for a logical network covered by the supernet and which has a numerically larger address than the subnet-parent node will fail to find the supernet-child node. This is because the value of the logical network is larger than that of the subnet-parent node, as a result of which the search algorithm will only search the right sub-branch of the tree from the subnet-parent node.

In the prior art this problem is avoided by not balancing the binary tree. As discussed above a problem with this approach is that searching the tree would be less efficient. Another solution is to modify the search algorithm to make sure that subnet will be found. However, this results in the search algorithm also becoming less efficient because the defining characteristic of a binary search tree is no longer used.

There is therefore a need for storing a routing table using a balanced binary tree data structure in which the above problem does not occur.

In this specification the term subnet will be used to refer to any logical network which is a subnet of another network which will be referred to as a supernet hereinafter.

SUMMARY OF THE INVENTION

The invention provides a method of storing a routing table having a plurality of routes associated with a plurality of networks, each being identified by a network address. The method includes constructing a binary tree data structure in which a key value of each node in the binary tree data structure corresponds to a network address of a network of the plurality of networks; and rearranging the binary tree data structure so that any node having a key value which is a supernet of a network corresponding to the key value of any other node in the binary tree data structure becomes a parent of such other node.

BRIEF DESCRIPTION OF THE DRAWINGS

FIG. 2 shows the address ranges covered by each IP address class of FIG. 1,

DETAILED DESCRIPTION

Described herein is a method of storing a routing table using a binary search tree data structure in which the key value of each node in the tree corresponds with a network address of a network in the routing table.

For the sake of convenience, the invention will be described with reference to the IP addressing scheme used by the TCP/IP protocol suite. However, it will be appreciated by those skilled in the art that the invention may be practiced using other addressing schemes.

As will be discussed in more detail below, IP addressing makes use of sub-netting where a single network address may be used to cover a large number of logical subnet addresses. As previously defined, the single network which covers a number of logical networks will be referred to as the supernet and the logical networks which are covered by the supernet will be referred to as the subnets.

According to embodiments of the invention, the binary tree data structure is manipulated in order to ensure that the key value of each parent node in the tree is not a subnet of the key value of its left child node.

Before describing the invention in detail, some background on IP addressing is necessary.

IP addresses are 32 bit numbers, comprising a first part and a second part. The first part of the address identifies the network on which a host resides, while the second part identifies the host.

Figure 1:
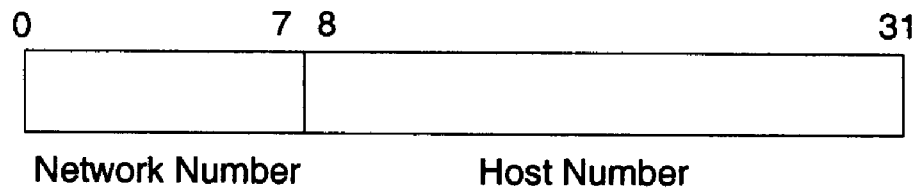
FIG. 1 shows a schematic representation of the three fundamental IP address classes.
Figure 1:
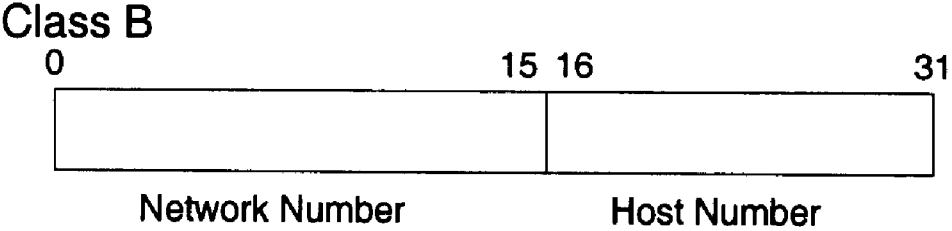
Figure 1:
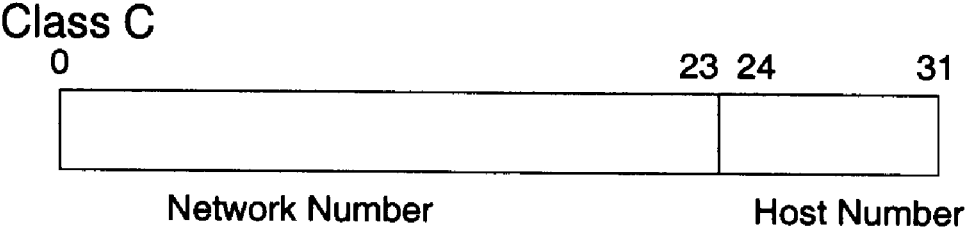

In order to provide flexibility to support different size networks, the IP address space has been divided into different address classes. This is known as classful addressing. There are three fundamental address classes viz. Class A, Class B and Class C. The format of the fundamental address classes is illustrated in FIG. 1 of the drawings.

To make it easier for human readers to read and write, IP addresses are often expressed as four decimal numbers, each separated by a dot. This format is known as "dotted-decimal notation" and it divides the 32 bit internet address into four 8-bit fields and specifies a value of each field independently as a decimal number with the fields separated by dots.

Each of the Class A, B or C network numbers (see FIG. 1) can be divided into smaller pieces. This known as subnetting. The basic idea of subnetting is to divide the extended classful host number field into two parts namely a subnet-number part and a host-number part which indicates the number of the host on a particular subnet. FIG. 2 displays the range of dotted-decimal values that can be assigned to each of the fundamental address classes. The "xxx" represents the host-number field of the address. Subnetting is used to simplify IP routing tables as it will be appreciated that with the use of subnetting, the route from, for example, the Internet to a specific subnet of a given IP address is the same, no matter which subnet the destination host is on. Subnetting is also used to change the effective class of the fundamental address classes. A Class A fundamental address can be an effective Class B address through subnetting.

Figure 3:
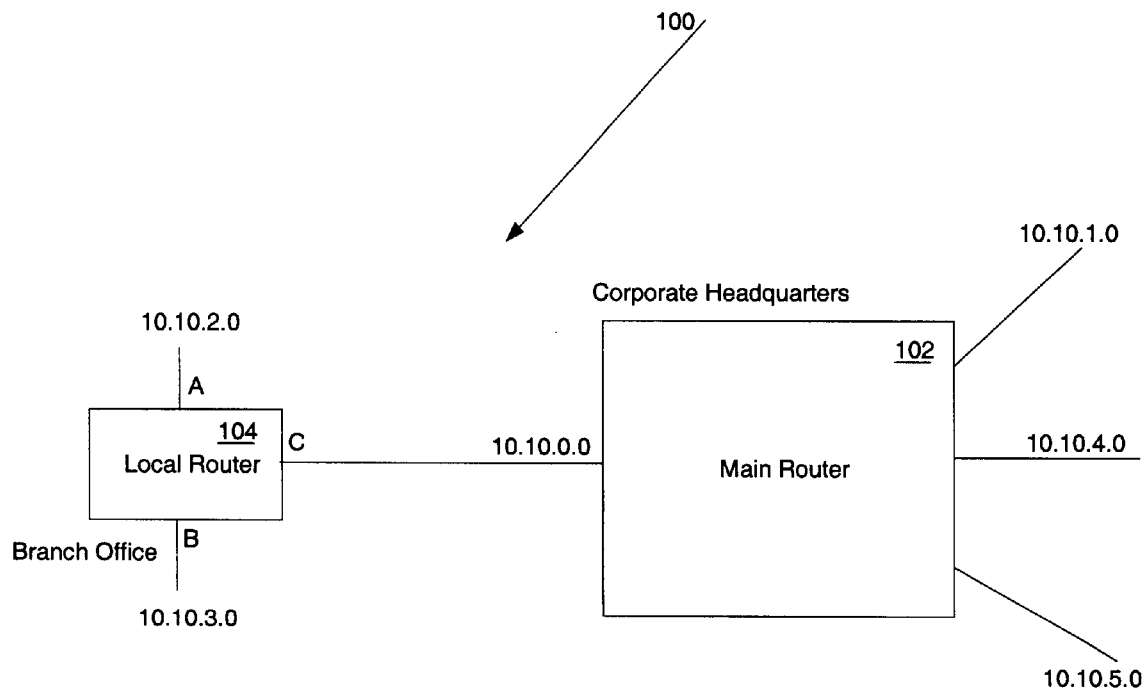
FIG. 3 shows a block diagram of a simple corporate network.

The invention will now be described with reference to FIG. 3 of the drawings, in which reference numeral 100 generally indicates a corporate network of a large corporation which has been assigned, for example, the effective Class B network 10.10.0.0. The corporate network 100 includes a main router 102 which is the router for the head office of the corporation and a local router 104 which is the router for a branch office of the corporation. As can be seen, the local router 104 is directly connected to networks 10.10.2.0 and 10.10.3.0. each of which may be assigned, for example, to different departments at the branch office. The main router 102 stores routes for logical networks 10.10.1.0, 10.10.4.0 and 10.10.5.0 and subnet 10.10.0.0.

Figure 4:
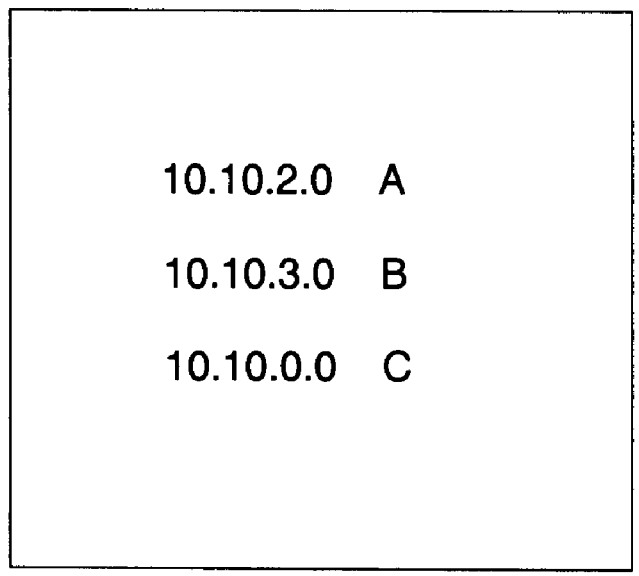
FIG. 4 shows a routing table for the local router of FIG. 3.

The routing table for local router 104 might, for example, look like the table shown in FIG. 4 where the IP addresses of the networks known to local router 104 are matched against network interfaces (i.e. the physical connections which router 104 has to make in order to send a data packet a particular network). Thus, for example, the routing table tells local router 104 that in order to send a data packet to a host on network 10.10.5.0, the data packet must be sent to network 10.10.0.0 via interface C. By using subnetting, the routing table for local router 104 can be kept simple in the sense that interfaces for subnets 10.10.1.0, 10.10.4.0 and 10.10.5.0 need not be stored. Instead, only a route to supernet 10.10.0.0 is stored.

Figure 5:
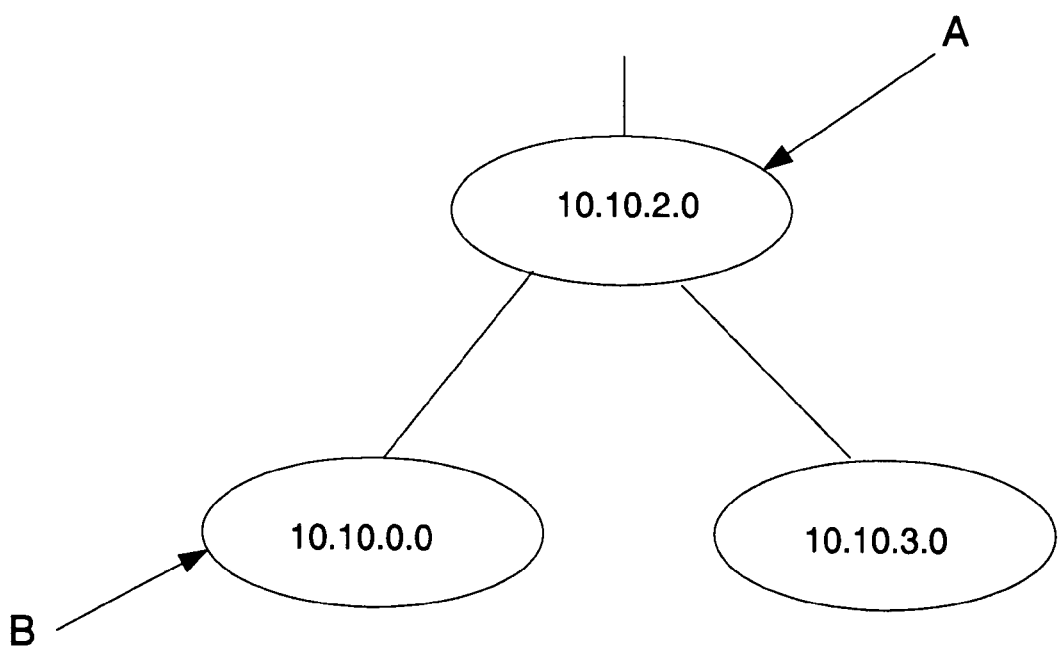
FIG. 5 shows a tree data structure for storing the routing table of FIG. 4.

FIG. 5 of the drawings illustrates an example of a binary search tree constructed for the routing table shown in FIG. 4. It will be seen that supernet 10.10.0.0 occurs as a left child node of subnet 10.10.2.0. For convenience, the node whose key value corresponds with the subnet 10.10.2.0 has been labeled A and the node whose key value corresponds with the supernet has been labeled B. Assume that a data packet is addressed to destination host 10.10.5.6 on subnet 10.10.5.0. In this case, a binary tree search algorithm will always take the right sub-branch from node A in the tree because the address of the destination host (i.e. 10.10.5.6) is numerically higher than the key value of the node A. Thus a search of the tree shown in FIG. 5 will not find a route for the destination host 10.10.5.6.

Figure 6:
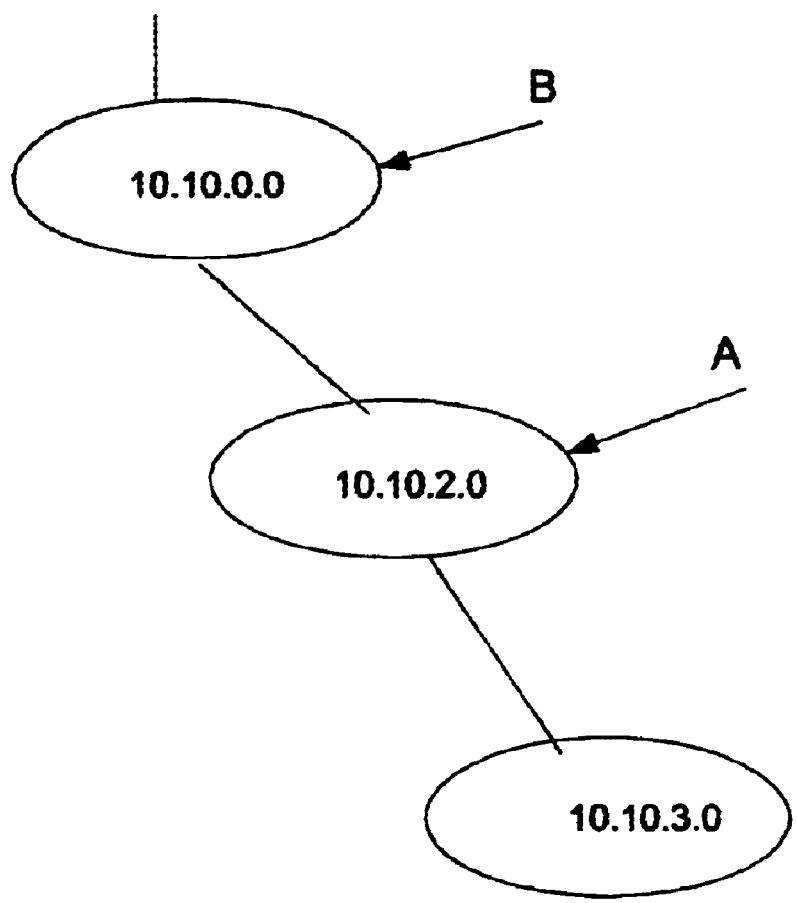
FIG. 6 shows the tree data structure of FIG. 5, after balancing.
Figure 7:
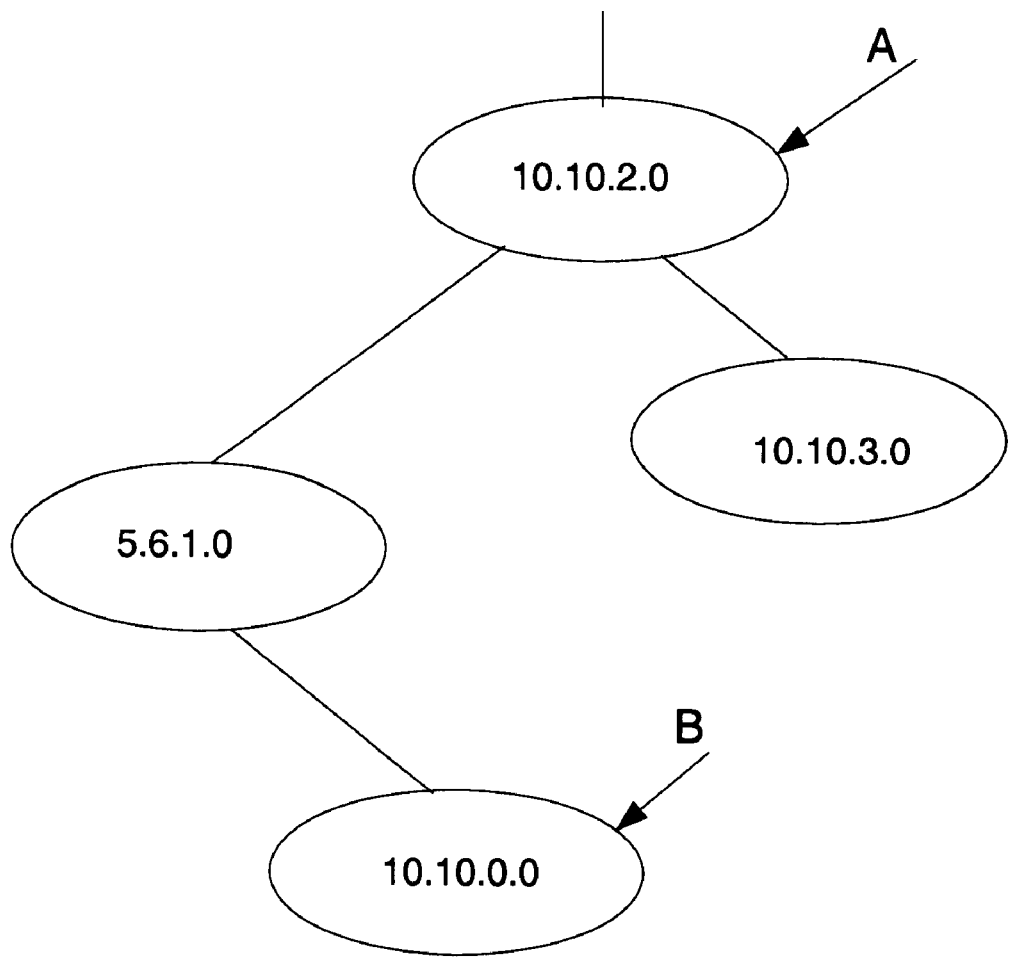
FIG. 7 shows another tree data structure for a routing table in which a conventional binary tree search algorithm will not find the node with the IP address 10.10.0.0.

According to one embodiment of the invention, subnet node A is rotated to the right, after which the tree will look like the tree shown in FIG. 6 of the drawings. It will be seen that the supernet node B now appears as a parent of subnet node A. A search of the tree shown in FIG. 4 for the destination host 10.10.5.6 will now be successful because supernet 10.10.0.0 satisfies the search criteria The problem described above could also arise in a binary tree data structure such as the one shown in FIG. 7 of the drawings. The difference between the tree show in FIG. 7 and the tree shown in FIG. 6 is that supernet node B in the case of the tree shown in FIG. 7 occurs somewhere on the left sub-tree of the subnet node A, but not as a left child node of the node A. As described below, the invention is able to handle a search of a tree such as the one shown in FIG. 7.

Figure 8:
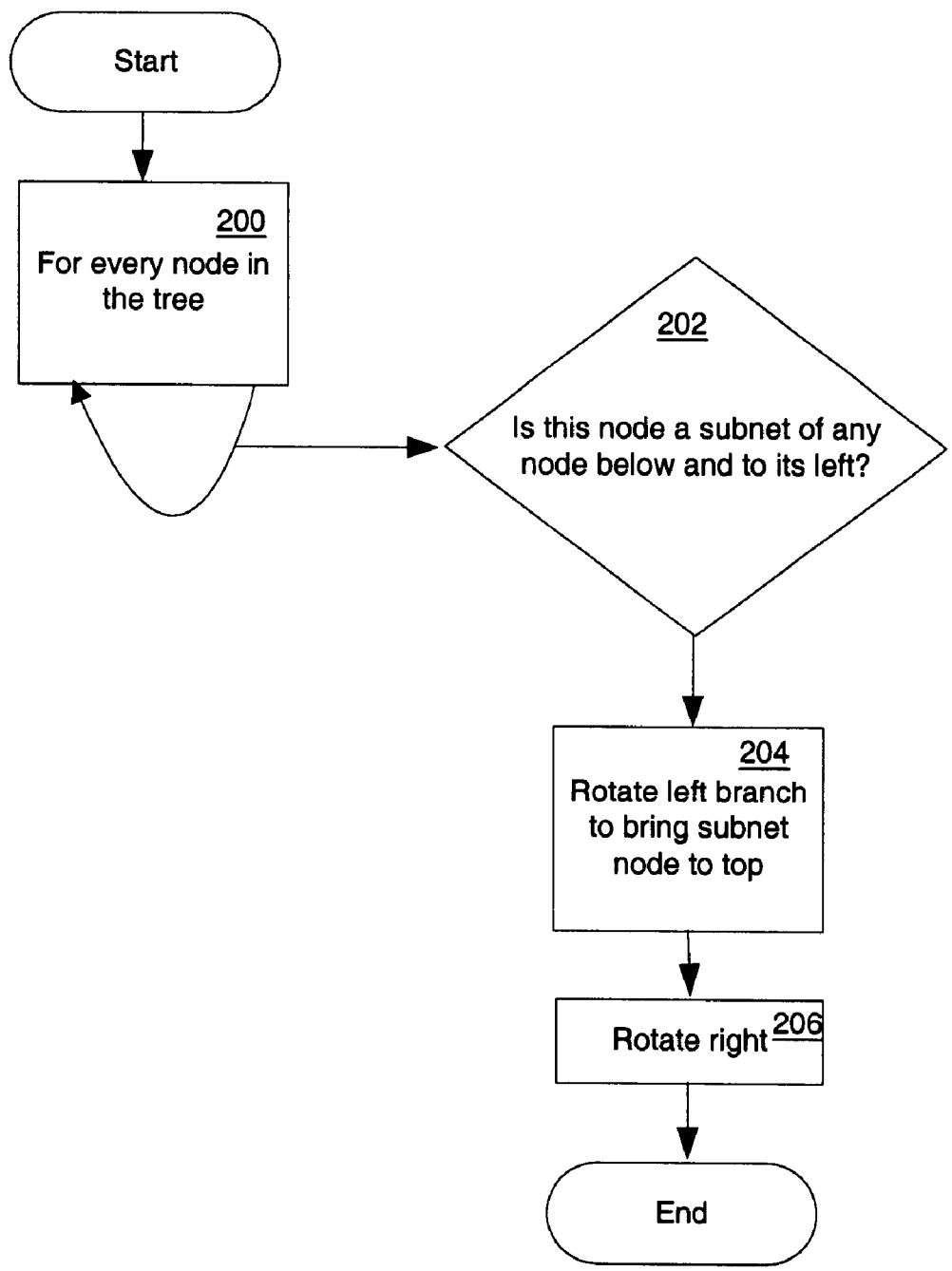
FIG. 8 shows a flow chart illustrating the method of the invention.

FIG. 8 of the drawings shows a flowchart illustrating a method for storing a routing table in accordance with one embodiment of the invention. Referring to the flowchart, it will be seen that at 200, for each node in the tree (hereinafter called a parent node, for convenience), a determination is made at 202 as to whether the parent node has a key value which makes it a subnet of the key value of any node below and to its left. If it is found that the key value of the parent node is in fact a subnet of the key value of a node below and to its left then at 204 the left sub-tree of the node is rotated so as to make that node a left child node of the parent node. Thereafter, the parent node is rotated to the right at 206 thereby making it a child of its left child.

The operations of rotating the left branch and rotating a node to the right are well known operations performed on binary trees. A binary tree data structure in accordance with the invention may be programmed using any suitable programming language and the C++ programming language is particularly suitable. The steps illustrated in the flowchart of FIG. 8 are shown below in the form of pseudo code.

```
function FixOverlapping Routes (NodePtr)
{
  while (NodePtr is a valid node)
  {
    if (NodePtr->Left is a valid node)
    {
      if (NodePtr is a subnet of NodePtr->Left)
      {
        //Rotate NodePtr up to be the parent node
        RouteRight(NodePtr);
```

```
    NodePtr = NodePtr->Parent is a valid node) NodePtr =
    NodePtr->Parent;
      Continue;
    }
    //Recursively do the left branch before continuing to the right
    FixOverlappingRoutes(NodePtr->Left);
  }
  NodePtr = NodePtr->Right;
  }
}
```

In a particularly advantageous embodiment of the invention, the binary search tree may be implemented as a red-black tree. Red-black trees are binary trees with the characteristic that each node is assigned a "color" and specific rules are observed during insertion and deletion of nodes. The rules ensure that the red-black tree is always balanced. Briefly the rules for red-black trees are:

(a) Every node is either red or black;
(b) The root node is always black; and
(c) If a node is red, its children must be black;

Every path from the root to a leaf or to null child node must contain the same number of black nodes.

After performing the operations according to the flowchart of FIG. 8, the search algorithm scans the tree as normal until a match is found. The scan then continues to look for further matches by following the right sub-tree from the matched node. If multiple matches are found then the last (lower most) one is selected.

Figure 9:
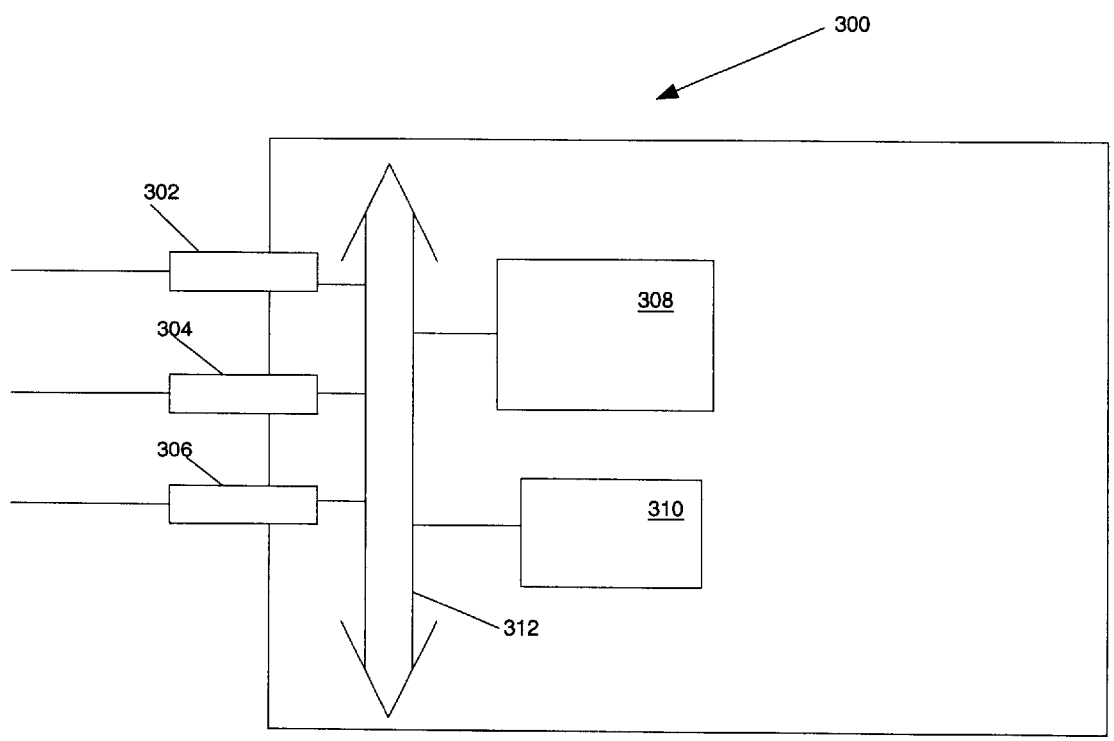
FIG. 9 shows a block diagram of a router in accordance with the invention.

Referring now to FIG. 9 of the drawings, reference numeral 300 generally indicates a schematic simplified drawing of a router in accordance with the invention for the routing table of FIG. 4. The router 300 includes network interfaces 302, 304 and 306. Network interfaces 302 and 304 are to subnets 10.10.2.0 and 10.10.3.0 of the branch office and network interface 306 is to the main router 102 (network address 10.10.0.0.). The routing 300 includes a routing processor 308 which may be a standard processor or a specialized routing processor. The routing table for router 300 is stored in a memory device 310. Although illustrated as being separate from the routing processor, the memory device 310 can reside in the routing processor 308. Each of the interfaces 302 to 306, the processor 308 and memory device 310 are connected via a bus 312. When a data packet is received from one of the network interfaces 302, 304, the routing processor 308 scans the routing table for the destination IP address embedded in the received packet and reads the next hop IP address of the router corresponding to the destination IP address from the routing table. Subsequently, the routing processor 308 finds the interface on which it must send the received packet as an outgoing packet. The routing processor 308 includes software to implement the methodology of the invention.

The present invention may be implemented in a variety of ways. For example, the invention may be implemented completely in software, completely in hardware, or in a combination of both. Having thus described one particular embodiment of the invention, various alterations, modifications, and improvements will readily occur to those skilled in the art. Such alterations, modifications, and improvements are intended to be part of this disclosure, and are intended to be within the spirit and scope of the invention.

What is claimed is:

1. A method of storing a routing table having a plurality of routes associated with a plurality of networks, each being identified by a network address, the method including:

constructing a binary tree data structure in which the key value of each node in the binary tree data structure corresponds to a network address of a network of the plurality of networks; and rearranging the binary tree data structure so that any node having a key value which is a supernet of a network corresponding to the key value of any other node in the binary tree data structure becomes a parent of such other node.

2. A method as claimed in claim 1, in which constructing the binary tree data structure includes constructing a binary search tree data structure wherein a key value of each left child node is less than a key value of its parent node and a key value of each right child node is greater than or equal to the key value of its parent node.

3. A method as claimed in claim 2, in which rearranging the tree data structure includes:

examining a left branch of the binary search tree data structure for parent-child relationships in which a parent node has a key value which makes it a subnet of the network corresponding to the key value of its left child node; and rotating the parent node to the right.

4. A method as claimed in claim 3, which includes first examining the left branch of the binary search tree data structure for any nodes whose key value makes it a supernet of a network identified by the key value of the root node of the left branch; and rotating the left branch so that such a node becomes the left child node of the root node of the left branch.

5. A method as claimed in claim 2, in which constructing the binary search tree data structure includes constructing a red-black tree data structure.

6. A computer which includes a processor and a memory having stored therein executable code which when executed by the processor causes the processor to perform a method of storing a routing table having a plurality of routes associated with a plurality of networks, each being identified by a network address, the method including:

constructing a binary tree data structure in which a key value of each node in the binary tree data structure corresponds to a network address of a network of the plurality of networks; and rearranging the binary tree data structure so that any node, having a key value which is a supernet of a network corresponding to the key value of any other node in the binary tree data structure, becomes a parent node of such other node.

7. A computer as claimed in claim 6, in which constructing the binary tree data structure includes constructing a binary search tree data structure wherein a key value of each left child node is less than the key value of its parent node and a key value of each right child node is greater than or equal to the key value of its parent node.

8. A computer as claimed in claim 7, in which rearranging the binary tree data structure includes examining a left branch of the binary search tree data structure for parent-child relationships in which a parent node has a key value which makes it a subnet of the network corresponding to the key value of its left child node; and rotating the parent node to the right.

9. A computer as claimed in claim 8, in which the method includes first examining the left branch of the binary search tree data structure for any nodes whose key value makes it a supernet of a network identified by the key value of the root node of the left branch; and rotating the left branch so that such a node becomes the left child node of the root node of the left branch.

10. A computer as claimed in claim 7, in which constructing the binary search tree data structure includes constructing a red-black tree data structure.

11. A computer readable medium having stored thereon executable code which when executed by a processor causes the processor to perform a method of storing a routing table having a plurality of routes associated with a plurality of networks, each being identified by a network address, the method including:

constructing a binary tree data structure in which a key value of each node in the binary tree data structure corresponds with a network of the plurality of networks;

rearranging the binary tree data structure so that any node, having a key value which is a supernet of a network corresponding to the key value of any other node in the tree, becomes a parent node of such other node.

12. The computer readable medium of claim 11, in which constructing the binary tree data structure includes constructing a binary search tree data structure wherein a key value of each left child node is less than a key value of its parent and the a value of each right child node is greater than or equal to a key value of its parent node.

13. The computer readable medium of claim 12, in which rearranging the binary search tree data structure includes examining a left branch of the binary tree data structure for parent-child relationships in which the parent node has a key value which makes it a subnet of the network corresponding to the key value of its left child node; and rotating the parent node to the right.

14. The computer readable medium of claim 13, in which the method further includes first examining the left branch of the binary tree data structure for any nodes whose key value makes it a supernet of a network identified by the key value of the root node of the left branch; and rotating the left branch so that such a node becomes the left child node of the root node of the left branch.

15. The method of claim 12, in which constructing the binary search tree data structure constructing a red-black tree data structure.

16. Apparatus for storing a routing table having a plurality of routes associated with a plurality of networks, each being identified by a network address, the apparatus including:

means for constructing a binary tree data structure in which a key value of each node in the binary tree data structure corresponds with a network address of a network of the plurality of networks;

means for rearranging the binary tree data structure so that any node, having a key value which is a supernet of a network corresponding to the key value of any other node in the binary tree data structure, becomes a parent of such other node.

17. Apparatus as claimed in claim 16, in which the means for constructing the binary tree data structure includes means for constructing a binary search tree data structure wherein a key value of each left child node is less than the key value of its parent node and the value of each right child node is greater than or equal to the key value of its parent node.

18. Apparatus as claimed in claim 17, in which the means for rearranging the binary search tree data structure includes means for examining a left branch of the binary search tree data structure for parent-child relationships in which a parent node has a key value which makes it a subnet of the network corresponding to the key value of its left child node; and rotating the parent node to the right.

19. Apparatus as claimed in claim 18, which includes means for first examining the left branch of the binary search tree data structure for any nodes whose key value makes it a supernet of a network identified by the key value of the root node of the left branch; and rotating the left branch so that such a node becomes left child node of the root node of the left branch.

20. Apparatus as claimed in claim 17, in which the means for constructing the binary search tree data structure includes means for constructing a red-black tree data structure.

21. A method to construct a routing table as a binary tree data structure, the method including:

constructing the binary tree data structure such that first and second key values of respective first and second nodes in the binary tree data structure correspond to first and second network addresses of respective first and second networks of a plurality of networks;

determining whether the first network is a supernet of the second network by performing a comparison between the first and second key values; and if so, arranging the binary tree data structure so that the first node becomes a parent node of the second node.

* * * * *